Dec. 23, 1952        K. C. ENVOLDSEN        2,622,270
PROCESS FOR TREATING SHRIMP
Filed July 17, 1947        2 SHEETS—SHEET 1
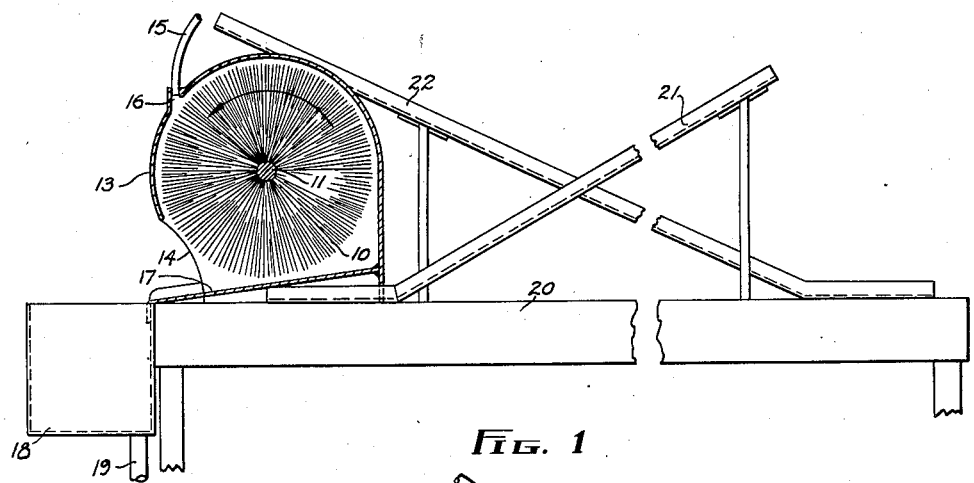
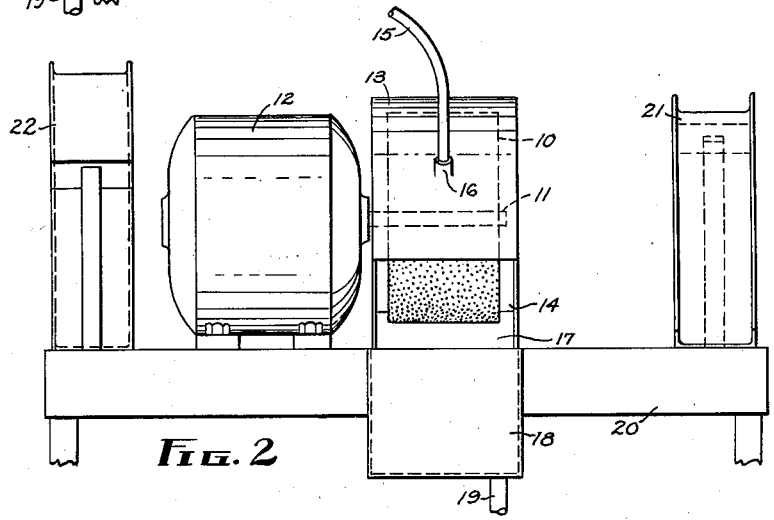
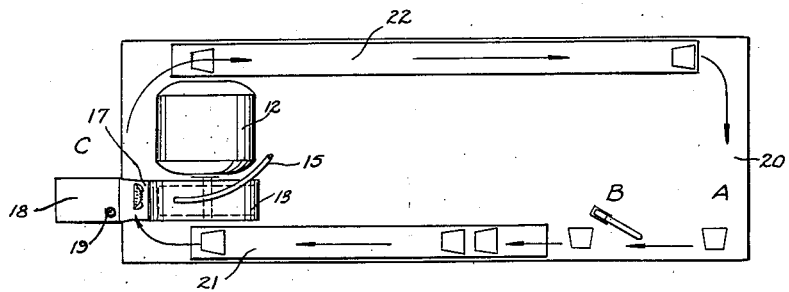
INVENTOR
KARL C. ENVOLDSEN
BY
Evans & McCoy
ATTORNEYS Dec. 23, 1952 K. C. ENVOLDSEN 2,622,270
PROCESS FOR TREATING SHRIMP
Filed July 17, 1947 2 SHEETS—SHEET 2

INVENTOR
KARL C. ENVOLDSEN
BY
Evans & McCoy
ATTORNEYS

Patented Dec. 23, 1952

2,622,270

UNITED STATES PATENT OFFICE 2,622,270

PROCESS FOR TREATING SHRIMP

Karl C. Envoldsen, Cleveland, Ohio

Application July 17, 1947, Serial No. 761,573

5 Claims. (Cl. 17—45)

1

This invention relates to a process of and apparatus for treating shrimp preparatory to eating.

It is an object of the present invention to provide a process of and apparatus for treating shrimp in which shrimp may be treated quickly and economically to effect complete removal of the sand vein or other foreign material and to preserve during heat treatment the delicate coloring, firm texture and tasty flavor desired when eating shrimp.

Presently known processes for automatically or semi-automatically handling shrimp to accomplish the removal of the sand vein, and to clean and prepare them for eating, involve the handling of the shrimp with the shells on, presumably to avoid injury to the soft, fragile body of the shrimp. The vein removal is generally accomplished by a rotary cutting tool having peripheral teeth, the width of the wheel corresponding to the average width of the vein. The cutter is advanced into the shrimp and mills or tears a channel, removing, to a predetermined depth, portions of shell, vein, and adjacent flesh from the shrimp body. Generally this does not accomplish a thorough and clean removal of the sand vein. Due to the variation in the size of shrimp the sand vein may not always be located in the proper spot and will vary in depth, so that a cutter of this type will invariably remove insufficient vein or too much of the flesh adjacent the vein or both. In many instances this type of treatment severely mutilates the tender flesh of the shrimp body, which mutilation will accelerate the time within which the shrimp will spoil.

The present invention has for an object the complete removal of the vein and other foreign material from the shrimp body without damage to the shrimp body. According to the present invention the removal may be accomplished from shrimp of varying size, with each shrimp given the treatment proper for its size and to accomplish complete removal without mutilation.

A further object is to prepare shrimp for eating in which the cleaning and deveining may be accomplished quickly so that the time during which the shrimp are not subjected to cooling temperatures, which will preserve and greatly retard spoilage, is a minimum.

Another object of the present invention is to provide a process of treating shrimp which will provide a superior finished product, being a complete shrimp with a minimum of damage to the flesh and having a crisp appetizing texture and a superior flavor derived from the treating process.

Present day processes of treating the shrimp subsequent to shelling, deveining, and cleaning, comprise immersing the shrimp in boiling water for a substantial period, such as 5 to 15 minutes. It has been found that such treatment is deleterious to the flavor and to the texture of the shrimp. It is, therefore, an object of the present invention to treat the shrimp with heat to accomplish the cooking without deleteriously affecting the desirable characteristics of the shrimp.

Other objects and advantages will become apparent from the following detailed description in which:

Figure 1 is a side elevational view, partly in section, of a form of apparatus embodying the present invention;

Fig. 2 is an end elevational view of the apparatus in Fig. 1;

Fig. 3 is a plan view of the apparatus shown in Figs. 1 and 2 to diagrammatically illustrate how steps in the process of the present invention may be carried out;

A preferred embodiment of the process of the present invention comprises the following sequence of operations in treating the shrimp body preparatory to eating. The shell of the shrimp is removed and it is loaded into a suitable holder, preferably along with a plurality of other shelled shrimp. In their supported position the flesh of the shrimp covering the sand vein is slit to or partially through the sand vein. The nature of the slitting and the nature of fresh shrimp flesh causes the flesh along the margin of the slit to recede, thus exposing the sand vein for ready removal. The vein may then be removed in a gentle fashion so as not to remove or mutilate the surrounding flesh. The body of the shrimp is washed, removed from the holder, and immersed in a liquid where it may be subjected to heat treatment or cooking in order to prepare it for eating. After the heat treating step the shrimp are cooled, drained and promptly returned to refrigeration so that they will remain fresh and crisp until desired for sale or use.

The drawings illustrate apparatus embodying the present invention and which are suitable for carrying out the process. Fig. 3 diagrammatically illustrates the flow of the product during the sequence of operations to which it is subjected. The letter "A" indicates the station or location where shrimp, having had their shells removed previously, are disposed for loading into a suitable holder. The letter "B" indicates the location where the shrimp are slit. At the station indicated by the letter "C," the sand vein is removed and the shrimp given a preliminary cleaning. At this station the shrimp are removed from their holders and the holders returned to the loading station "A."

Figure 6:
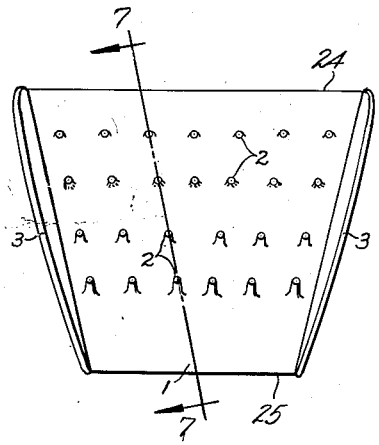
Fig. 6 is an enlarged plan view of a holder adapted to hold a plurality of shrimp bodies while the vein of the shrimp is removed.
Figure 7:
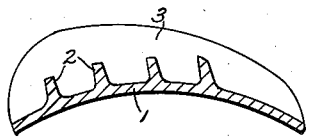
Fig. 7 is a cross sectional view of the holder shown in Fig. 6 taken along line 7—7 of Fig. 6.

Figs. 6 and 7 show a suitable form of holder to carry out the present invention. It may be seen that the holder comprises a channel-shaped member having a curved supporting surface 1 from which a plurality of studs or prongs 2 project. These studs should be sufficient to prevent movement of the shrimp during treating but should not be shaped to catch, tear, or mutilate the shrimp body. It has been found that a frusto-conical pin flattened at its top, such as by filing, is especially satisfactory for holding the shrimp against movement without rupturing or tearing the flesh. In addition to being convexly curved the supporting surface 1 is shown as tapering from a wider portion 24 adapted to accommodate the head ends of the shrimp to a narrower portion 25 adapted to accommodate the tail ends of the shrimp bodies. It is also provided with upstanding sides 3 of any suitable shape. It is preferred to design the holder so that it will accommodate a plurality of shrimp, such as, for example, 4 to 6, so that the operations of slitting and removing the sand vein can be accomplished for several shrimp at the same time. Further, by designing the holder to accommodate a plurality of shrimp, the shrimp will all fit snugly between the sides 3 of the holder, due to the variations from the average size of the shrimp. For ease in handling it is desirable to use a holder, shaped as shown in Figs. 6 and 7, so that it may be readily accommodated to the palm of the hand.

The holders may be formed of any suitable material which is sufficiently rigid to hold the shrimp in place during the treating and which will also withstand heat such as 212° F., in order that the holders may be boiled, steamed, or otherwise sterilized periodically, so that the shrimp will not be exposed to unsanitary contaminants during the treating operation. Holders made from cast metal, such as aluminum, magnesium, or alloys thereof, have been found satisfactory.

Figure 4:
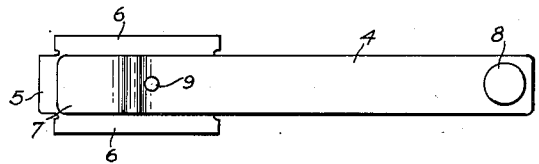
Fig. 4 is an enlarged elevational view of a tool which may be used in slitting the shrimp.
Figure 5:
Fig. 5 is an enlarged plan view of the tool shown in Fig. 4.

Figs. 4 and 5 illustrate a suitable slitting tool which comprises a handle portion 4 and a double edged cutting blade 5 having cutting edges 6 extending beyond the sides of the handle for a distance approximating the depth of the sand vein below the surface of the body of the shrimp. Disposed at either side of the cutting blade 5 and suitably spaced therefrom are guide portions 7 which are offset extensions of the handle member 4. These guide portions 7 are provided to gauge the sides of the shrimp body so that the cutting edges may be kept in alinement with the central location of the sand vein and, also, the engagement of the guide portions with the shrimp body provides a ready means for insuring the proper depth of cut to sever the flesh of the shrimp body which covers the sand vein. A very useful slitting tool can be formed from two opposed flat metallic members secured together at the handle end in any suitable manner, such as by a rivet 8 and having offset portions at the opposite ends to form the guide portions 7. A suitable cutting blade, shown in the drawing as a double edged razor blade, may be disposed between the two opposed members and secured thereto such as by the screw 9 which passes through one of the opposed members and the cutting blade and is threadedly engaged by the other opposed member.

Figure 9:
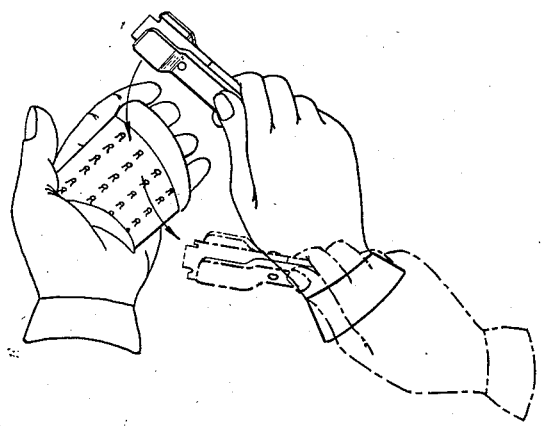
Fig. 9 is a diagrammatic sketch illustrating a preferred method of utilizing the shrimp holder and tool previously shown in Figs. 4 through 7.

The slitting operation may be readily and quickly accomplished by supporting a holder filled with shelled shrimp in one hand and passing the cutting edge of the slitting tool along the central top portion of the back of the shrimp, from the head toward the tail, employing an arcuate motion such as that indicated in Fig. 9. This particular motion is desirable since the sand vein is generally more deeply embedded in the region of the tail of the shrimp, and by slightly rotating the slitting tool during the cutting of the flesh superposed above the sand vein a greater depth of cut at the end of the stroke may be obtained.

This slitting operation may be repeated until each of the shrimp in the holder has the flesh above the sand vein severed by a thin, sharp cutting edge. Since the body of a fresh shrimp is firm and relatively elastic, this severing of the flesh will in a very short time result in the edges of the flesh adjacent the slit drawing back away from each other and thus revealing the sand vein.

The removal of the vein may then be readily accomplished by disengaging it at one end from the body of the shrimp and by a gentle action rolling the sand vein upon itself and finally completely removing it from the shrimp body. The sand vein does not possess very great tensile strength and is generally too weak and irregular in diameter to withstand pulling at one end to disengage it from the body. It has been found that a more complete removal can be effected by gently rolling the vein upon itself. Further, the gentle action required to roll the vein upon itself facilitates effective removal without mutilating or removing the flesh of the shrimp body to any appreciable or objectionable degree.

Suitable apparatus for accomplishing this vein removal is shown in Figs. 1 and 2. A suitable rotating brush wheel 10 may be mounted on a shaft 11 driven by a motor 12. The brush may be partially surrounded by a housing 13 having an opening 14 therein sufficiently large to permit one of the shrimp holders to be presented to the wheel 10 so that all the shrimp in the holder are exposed to a gentle brushing action. Concurrently with the brushing a stream of water or other suitable liquid may be employed to clean the shrimp body and flush the vein from the body. This may be done by feeding a stream of water from any suitable source (not shown) through a hose 15, and introducing this stream through the housing 13 at a suitable point indicated by the numeral 16, properly located with respect to the opening 14 where the shrimp engage the brush 10. For example, Fig. 1 shows the hose 15 entering the housing through opening at 16 spaced above the opening 14. When viewing Fig. 1 the brush is rotated in a counter-clockwise direction and the brush carries the water from the hose 15 down to and upon the shrimp.

In addition to accomplishing the vein removal, the simultaneous brushing and flushing of the shrimp body serves to loosen and remove any foreign matter which may be present on the shrimp bodies, such as, for example, sand, grit, etc. often found in the region of the neck of the shrimp bodies after the shell has been removed.

A suitable drip pan 17 forming a floor to the housing 13 beneath the brush 10 is provided to catch and carry off water and refuse removed from the shrimp body. The drip pan leads to a suitable catch box 18 adapted to receive the removed sand veins and debris washed from the shrimp body. The catch box 18 is provided with a drain 19 to carry off the water. Preferably the catch box 18 is removably secured so that it may be detached and emptied at suitable intervals.

The bristles of the brush wheel may be made of any suitable material. A horsehair bristle has been found to give exceptionally satisfactory results both from the standpoint of proper stiffness and long wear. It is believed that it is important to maintain a proper pressure between the shrimp bodies and the brush wheel in order to remove or extract the vein without damaging or removing flesh from the shrimp body. With experience in using the apparatus shown in the drawings, an operator can become very adept at presenting the holder and shrimp bodies to the rotating brush wheel at the same pressure. Apart from the operator's technique, the amount of pressure may be varied by a number of factors, such, as, the density of the bristles in the brush, the bristle material, the diameter of the brush wheel, the speed of rotation of the brush wheel, the flow of the flushing stream, etc. It is desirable to establish uniform conditions to facilitate maintenance of constant pressure by the operator in treating shrimp. It is accordingly contemplated, for example, that a variable speed control mechanism may be used in driving the brush wheel so that the rotary speed may be varied as the wheel wears, thus providing a uniform peripheral brush speed.

Periodically shrimp are obtained which are highly undesirable, due to their objectionable characteristics of giving off a strong odor resembling iodine or iodoform. It is believed that this odor is derived from food eaten by the shrimp. During the treating process, if such a shrimp is permitted to remain with other shrimp it will contaminate the adjacent shrimp and may necessitate throwing away a number of shrimp. It has been found that the present process and apparatus is adapted to facilitate the discovery of such shrimp so that they may be removed and thrown away before the contamination of other shrimp occurs. When the shrimp are subjected to the brushing operation to remove the sand vein, the rotating brush causes an air stream which passes out of the housing 13 through the opening 14 and is thus directed in the general direction of the operator. When objectionable shrimp contact the brush wheel, the operator is readily able to notice the unpleasant distinctive odor and to identify and select its source, whether it be one or several of the shrimp undergoing treatment. Such shrimp can be readily removed from the holder and discarded before they have contaminated other shrimp.

After removal and flushing of the sand vein from the shrimp bodies, the shrimp may be removed from the holder and subjected to further washing or cleaning as desired.

The process of treating the shrimp by the apparatus described above is efficiently carried out on a production basis by employing the sequence of operations shown in Figs. 1 to 3. The shrimp have their shells removed manually or by automatic machinery (not shown), and while still retained in a refrigerated condition are brought in suitable containers and placed on a table 20 on which the treating apparatus is supported. At station "A" (Fig. 3) the shrimp are removed from the containers and loaded into the holders. The holders are then passed to station "B" where the shrimp bodies are slit as previously described. After slitting, the holders are disposed in a slide or chute 21 to carry the holders and shrimp to station "C" by gravity for vein removal. After removal of the vein and the removal of the shrimp from the holders for cleaning and further treatment, the empty holders are placed in a suitable slide or chute 22 where they may travel by gravity back to station "A" for reloading with shrimp. If desired, the holders may be sterilized after use and prior to reloading.

Figure 8:
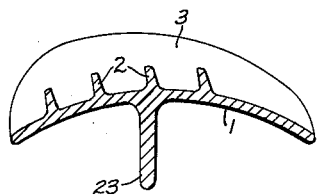
Fig. 8 is an enlarged sectional view, similar to Fig. 7, showing a modified form of shrimp holder.

Fig. 8 illustrates a modified form of holder similar to that shown in Figs. 6 and 7 except that in the central portion of the arcuate supporting surface 1 and at the under side thereof a transverse rib 23 is provided for more ready gripping of the holder in the palm of the hand during the shrimp loading, slitting, and vein removing operations.

By the present invention a superior shrimp product is obtained. The vein removal is extremely effective so that the treated product is free from the displeasing portions of the unremoved vein which, being dark in color, have a marked contrast with the pink and white flesh of the shrimp. The consistency or texture of the finished shrimp is greatly improved over that of other known treating processes and, in addition, each shrimp is complete since in accomplishing the vein removal no portion of the shrimp flesh is removed.

It is to be understood that the foregoing detailed description is for the purpose of illustration and explanation and is not be considered as limiting the scope of the invention as defined in the appended claims.

What I claim is:

1. The process of deveining shelled shrimp which comprises slitting the flesh of the shrimp longitudinally along the central portion of its back over the sand vein, and gently rolling the vein upon itself to remove it without injury to the shrimp body.

2. The process of treating shelled shrimp to remove the sand vein without mutilating the flesh, comprising longitudinally slitting the flesh along the back of the shrimp overlying the sand vein at least to, but not through, the sand vein, whereby the flesh recedes to either side exposing the sand vein, and gently rolling the sand vein upon itself by a gentle brushing action and removing the vein without removal or further mutilation of the flesh.

3. The process of treating shelled shrimp to remove the sand vein without mutilating the flesh, comprising longitudinally slitting the flesh along the back of the shrimp overlying the sand vein at least to, but not through, the sand vein, whereby the flesh recedes to either side exposing the sand vein, gently rolling the sand vein upon itself from one end of the vein to the other by a gentle brushing action, and, simultaneously with said brushing, flowing a stream of water over the shrimp in the direction of the brushing and rolling action to flush away the sand vein and any sand, grit or other foreign matter present.

4. The process of treating shelled shrimp to remove the sand vein without mutilating the flesh, comprising longitudinally slitting the flesh along the back of the shrimp overlying the sand vein at least to, but not through, the sand vein, whereby the flesh recedes to either side exposing the sand vein, gently rolling the sand vein upon itself by a gentle brushing action and removing the vein without removal of flesh, and drafting a stream of air from the shrimp in a selected direction during said rolling and removal of the vein to facilitate detection of shrimp having an unpleasant odor.

5. The process of treating shelled shrimp to remove the sand vein without mutilating the flesh, comprising longitudinally slitting the flesh along the back of the shrimp overlying the sand vein at least to, but not through, the sand vein, whereby the flesh recedes to either side exposing the sand vein, gently rolling the sand vein upon itself from one end of the vein to the other by a gentle brushing action, and, simultaneously with said brushing, flowing a stream of water over the shrimp in the direction of the brushing and rolling action to flush away the sand vein and any sand, grit or other foreign matter present, and drafting a stream of air from the shrimp in a selected direction during said rolling and removal of the vein to facilitate detection of shrimp having an unpleasant odor.

KARL C. ENVOLDSEN.

REFERENCES CITED

The following references are of record in the file of this patent:

UNITED STATES PATENTS

| Number | Name | Date |
| --- | --- | --- |
| 48,354 | Asmus | June 27, 1865 |
| 1,134,530 | Hauber | Apr. 6, 1915 |
| 2,235,342 | Turner | Mar. 18, 1941 |
| 2,244,072 | Ledbetter | June 3, 1941 |
| 2,263,694 | Grayson | Nov. 25, 1941 |
| 2,299,774 | Weems | Oct. 27, 1942 |